C. M. Tessié du Motay.
Making Bessemer Steel.
N° 87,479. Patented Mar. 2, 1869.
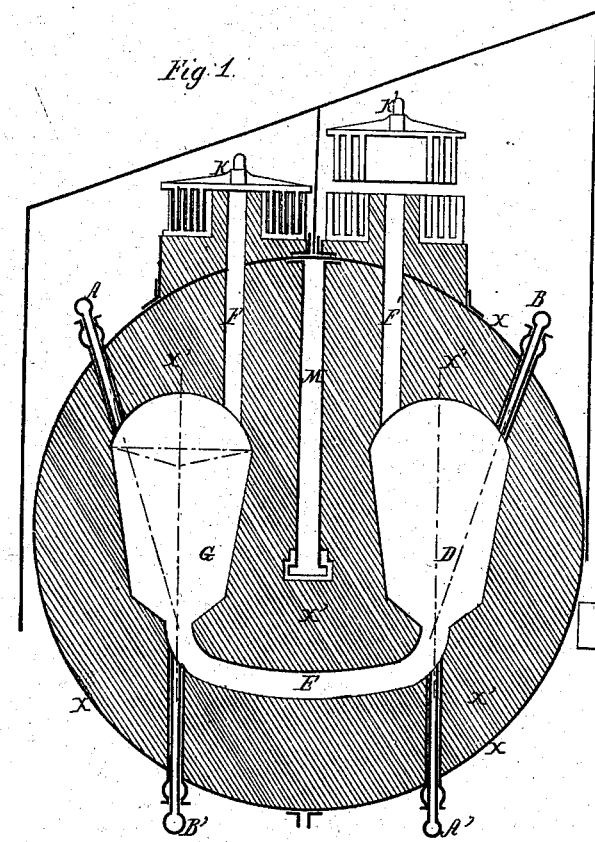
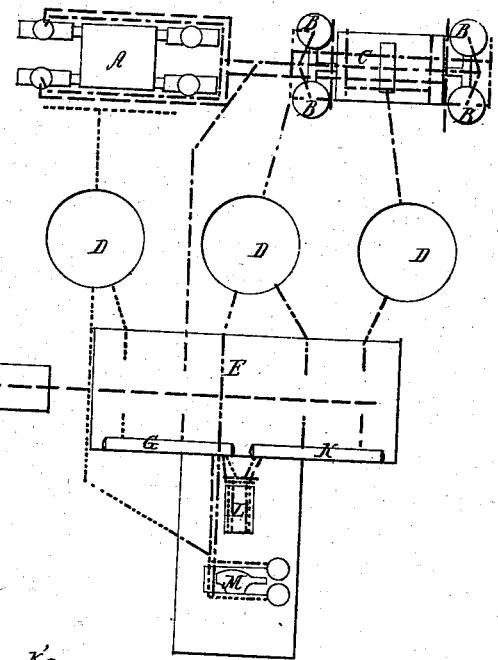
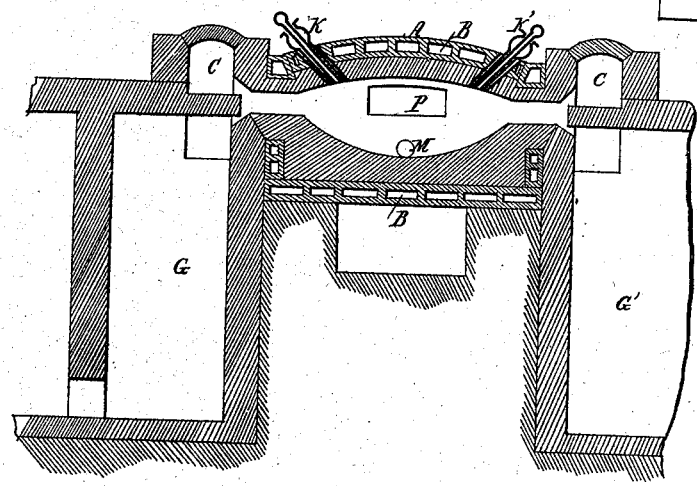
Witnesses:
Inventor,
C. M. Tessié du Motay
by
A. Pollok

UNITED STATES PATENT OFFICE.

CYPRIEN MARIE TESSIÉ DU MOTAY, OF PARIS, FRANCE, ASSIGNOR TO EDWARD STERN, OF NEW YORK, N. Y.

IMPROVEMENT IN THE MANUFACTURE OF IRON AND STEEL.

Specification forming part of Letters Patent No. 87,479, dated March 2, 1869.

*To whom it may concern:*

Be it known that I, CYPRIEN MARIE TESSIÉ DU MOTAY, of Paris, in the Empire of France, have invented certain new and useful Improvements in the Manufacture or Transformation of Iron and Steel, and in apparatus employed therein; and I hereby declare the following to be a full, clear, and exact description of the same, reference being had to the accompanying drawings.

The object I have in view is to produce an apparatus in which pig-iron, previously melted, either in a blast or cupola furnace, may, in the presence of oxides and silicates of iron, and of manganese and purifying agents, be brought to the condition of malleable steel or iron, and reciprocally; or malleable iron and steel may, in the presence of carbonizing-gases, carbon, or cyanides, be brought to the condition of cast-steel or cast-iron.

In order to attain this result, I have taken as a basis the following general facts: First, the oxides and silicates of iron, as well as the oxides and silicates of manganese, having less density than pig-iron, steel, and iron, can successively and alternately, in the apparatus hereinafter described, traverse unceasingly the mass of fused metal, and bring, by means of their oxygen, the carbon of the pig-iron to the condition of carbonic oxide or of carbonic acid, and thus transform the pig into malleable iron or steel; second, carbonizing agents, such as animal, mineral, or vegetable carbon, and the nitrogen and hydrogen compounds of carbon, being of a less density than melted iron or steel, are likewise capable, successively and by alternate action in the said apparatus, of traversing unceasingly the mass of fused metal, and of effecting the transformation, by means of their carbon, of malleable iron into steel or cast-iron, and of steel into cast-iron; third, lastly, in order to put in operation this double system of reduction and of carburation, the heat should be graduated at will, which result is attained by the employment, on the one hand, of gas free from nitrogen, such as the carburets of hydrogen, hydrogen, and carbonic oxides, and, on the other hand, of air, mingled air and oxygen, or pure oxygen.

It is therefore upon the difference in density between the oxidizing agents on the one hand and the carbonizing agents on the other, with relation to the metal, that my system of the metallurgical treatment of the steel and iron is essentially based; and the means by which this system is put into practical operation consists in the employment of gases capable of producing, successively and at will, temperatures varying between the fusing-point of cast-iron and the fusing-point of platinum—that is to say, within the limits of the highest known temperature.

With this preliminary statement of the nature of my invention, I shall now proceed to describe, by reference to the accompanying drawings, the metallurgical apparatus I employ in order to carry my method or system into effect.

Figure 1 represents a stationary apparatus.

X is a metallic cylinder, serving as a casing for a block, X', of magnesia or alumina, which is tightly bound and compressed, and in which are formed chambers C and D, placed in communication by a chamber, E. Two openings, F F', are formed in the block X', and extend to the exterior of the cylinder. Two cast-metal covers, K K', are arranged to close at pleasure the openings F F'. Two series of blow-pipe tuyeres, A B, are arranged to inject into the apparatus flames produced by the mixture of air, mingled air, and oxygen, or pure oxygen, with carbonic oxide, pure hydrogen, or carbureted hydrogens.

Two other series of blow-pipe tuyeres, A' B', are arranged to inject either a mixture of combustible gases and consuming gases, or either one or the other separately, or pulverized carbon or cyanides.

The two groups of tuyeres A A' and B B' operate alternately in order to drive the metal to be puddled from the chamber C into the chamber D, and vice versa.

M is a hollow sheet-metal stay, through which air circulates. If there are introduced into this apparatus melted pig and oxides and silicates of iron and manganese, these latter substances will float on the metal. If, then, as represented in the drawing, the opening F be closed by means of the cover K, the other opening remaining open, and if the inflamed gases be injected through the series of blow-pipe tuyeres A, the consuming gases, while heating the mass, will produce a pressure upon the metallic bath, and will force it to pass through the channel E into the chamber D.

As soon as all the metal has passed into D the metallic oxides and silicates, passing also into this chamber, will be beneath the bath of cast-iron, and, by reason of their inferior density, will pass up through the same in the form of globules, to again gather upon its surface. At the same moment the gases contained in the chamber C, uniting with those injected through the tuyeres A', will likewise traverse the bath, causing a thorough agitation of the mass, besides acting as oxidizing agents.

Upon the termination of this first operation the action of the tuyeres is reversed, A and A' being closed and B and B' open, the opening F being opened and the opening F' closed, so that the mass is forced back from the chamber D into C, and subjected to the same chemical and physical actions, and so on until the complete transformation of the cast-iron into malleable iron and steel is effected.

When the iron and steel thus produced and melted are combined with too great a quantity of metalloids they are recarbonized by injecting through the tuyeres A' and B' carbonizing-gases, with a mixture of these gases, or of hydrogen gas with carbon or cyanides, until the malleable iron is transformed anew into cast-iron; and the same operation is performed when it is desired to bring the iron refined by the first operation to the condition of steel.

The form and arrangement of the apparatus may be varied according as it is desired to effect a complete or partial conversion. It may be fixed and stationary, or suspended, or made capable of being reversed.

In case the apparatus is suspended on journals or pivots, it may be rocked or swung to and fro to any desirable extent.

In case the apparatus is to be reversed or turned over, it has the form of an hour-glass, movable upon pivots placed at its center of gravity.

The chambers C D are located one above the other. The apparatus is reversed quickly at certain intervals, and in each position the tuyeres below supply the blast and the valve above is open. When the malleable iron and steel or the cast-iron thus produced are brought to the desired state they are run off, through a tap-hole, conveniently located, either into molds or into a reverberatory furnace, A, Fig. 2. The arch and sole of this furnace are made of compressed magnesia or alumina, having water-jackets B. This furnace is intended to anneal or purify the steel and iron, or to melt, in contact with the melted iron and steel, the scraps arising from the preceding operations. This reverberatory furnace is likewise heated by the mixtures of gas employed in the converting apparatus above described, which mixtures, passing into the spaces G G', as well as the tuyeres K K', bring in contact with the surface of the bath either a mixture of oxygen and combustible gases or of reducing-gases.

Fig. 3 is a diagram of the converting apparatus and other apparatus connected therewith.

A is the oxygen-furnace, with its recurrential apparatus, and B are the four gas-generators for the production of the hydrogen. C is masonry-work, which supports two furnaces for carbureted-hydrogen gas, and a boiler to furnish the steam to the furnace A and gas-generators B. D D D are three gasometers for storing and distributing the oxygen, hydrogen, and carbureted gases. E is a structure containing the machines designed to compress and distribute the gas and the air. F represents two steam-boilers; G, two superposed pressure-reservoirs, the one for air and the other for oxygen. K represents two superposed pressure-reservoirs, the one for hydrogen and the other for carbureted hydrogen. L is the puddling apparatus, or the apparatus for converting cast-iron into malleable iron or steel, or for converting malleable iron into steel or cast-iron. M is the furnace for refining the puddled metal. It is provided with recurrential apparatus, or apparatus in which the gases are mixed.

In the diagram the conduits for the various gases are represented by different-colored lines, as will be understood by reference to the drawing.

What I claim as my invention, and desire to secure by Letters Patent, is—

1. The method of effecting the transformation or conversion of iron and steel, substantially in the manner and by the means herein shown and set forth.

2. The apparatus for the manufacture or transformation of iron and steel, constructed and operating substantially as herein shown and described.

In testimony whereof I have signed my name to this specification before two subscribing witnesses.

C. M. TESSIÉ DU MOTAY.

Witnesses:
  J. ARMENGAUD,
  DAVID T. G. FULLER.